United States Patent
McMullen et al.

(10) Patent No.: US 9,125,107 B1
(45) Date of Patent: Sep. 1, 2015

(54) USE OF PING-PONG BORDER LOCATION AS APPROXIMATED MOBILE STATION LOCATION

(75) Inventors: Michael P. McMullen, Leawood, KS (US); Kevin L. Butler, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 2163 days.

(21) Appl. No.: 12/143,310

(22) Filed: Jun. 20, 2008

(51) Int. Cl.
*H04W 36/00* (2009.01)
*H04W 24/00* (2009.01)

(52) U.S. Cl.
CPC .............. *H04W 36/00* (2013.01); *H04W 24/00* (2013.01)

(58) Field of Classification Search
CPC ..... H04W 64/00; H04W 36/08; H04W 24/00; H04Q 7/20
USPC ...................... 455/435.1, 436.1, 436.2, 436.3; 370/401, 331, 456, 352
See application file for complete search history.

(56) References Cited

U.S. PATENT DOCUMENTS

| | | | |
|---|---|---|---|
| 2002/0126042 A1* | 9/2002 | Chang et al. | 342/354 |
| 2003/0050077 A1* | 3/2003 | Takeuchi et al. | 455/456 |
| 2006/0099946 A1* | 5/2006 | Burgess et al. | 455/435.1 |
| 2006/0234710 A1* | 10/2006 | Noh | 455/436 |
| 2006/0239231 A1* | 10/2006 | Hong | 370/331 |
| 2006/0281470 A1* | 12/2006 | Shi et al. | 455/456.2 |
| 2006/0291417 A1* | 12/2006 | Aust et al. | 370/331 |
| 2007/0014261 A1* | 1/2007 | Lee | 370/331 |
| 2007/0275707 A1* | 11/2007 | Kwak et al. | 455/414.2 |
| 2007/0281712 A1* | 12/2007 | Povey et al. | 455/456.1 |
| 2008/0014943 A1* | 1/2008 | Ahn et al. | 455/436 |
| 2008/0102831 A1* | 5/2008 | Ore | 455/435.1 |
| 2009/0275334 A1* | 11/2009 | Xie et al. | 455/436 |
| 2010/0240356 A1* | 9/2010 | Lee et al. | 455/422.1 |
| 2010/0240391 A1* | 9/2010 | Povey | 455/456.1 |

* cited by examiner

*Primary Examiner* — Khawar Iqbal

(57) ABSTRACT

Disclosed herein is a method for determining the location of a mobile station with greater accuracy than serving base station location and yet preferably without the consumption of network resources typical of satellite-based location determination. The method is applicable in a scenario where a mobile station is ping-ponging (or has just been ping-ponging) between two non-coterminous wireless coverage areas. According the method, in that scenario, the location of the mobile station will be approximated conveniently as the location of overlap between the two wireless coverage areas, since it is most likely that the mobile station resides in that overlap area.

20 Claims, 3 Drawing Sheets

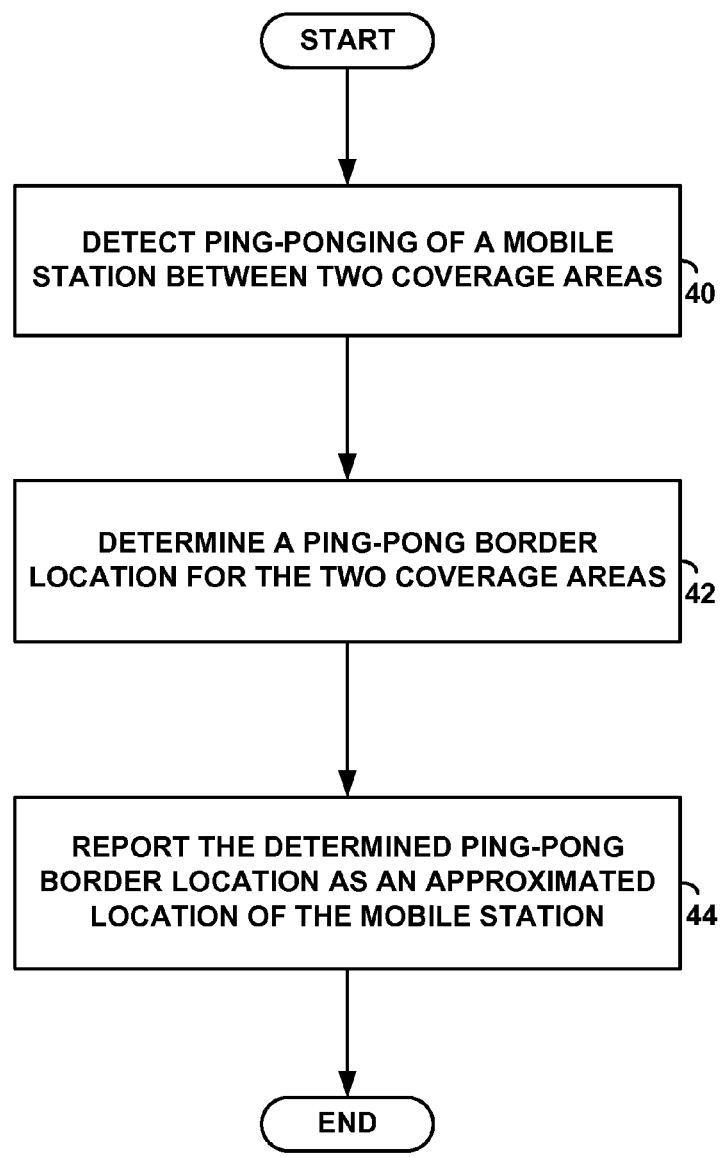

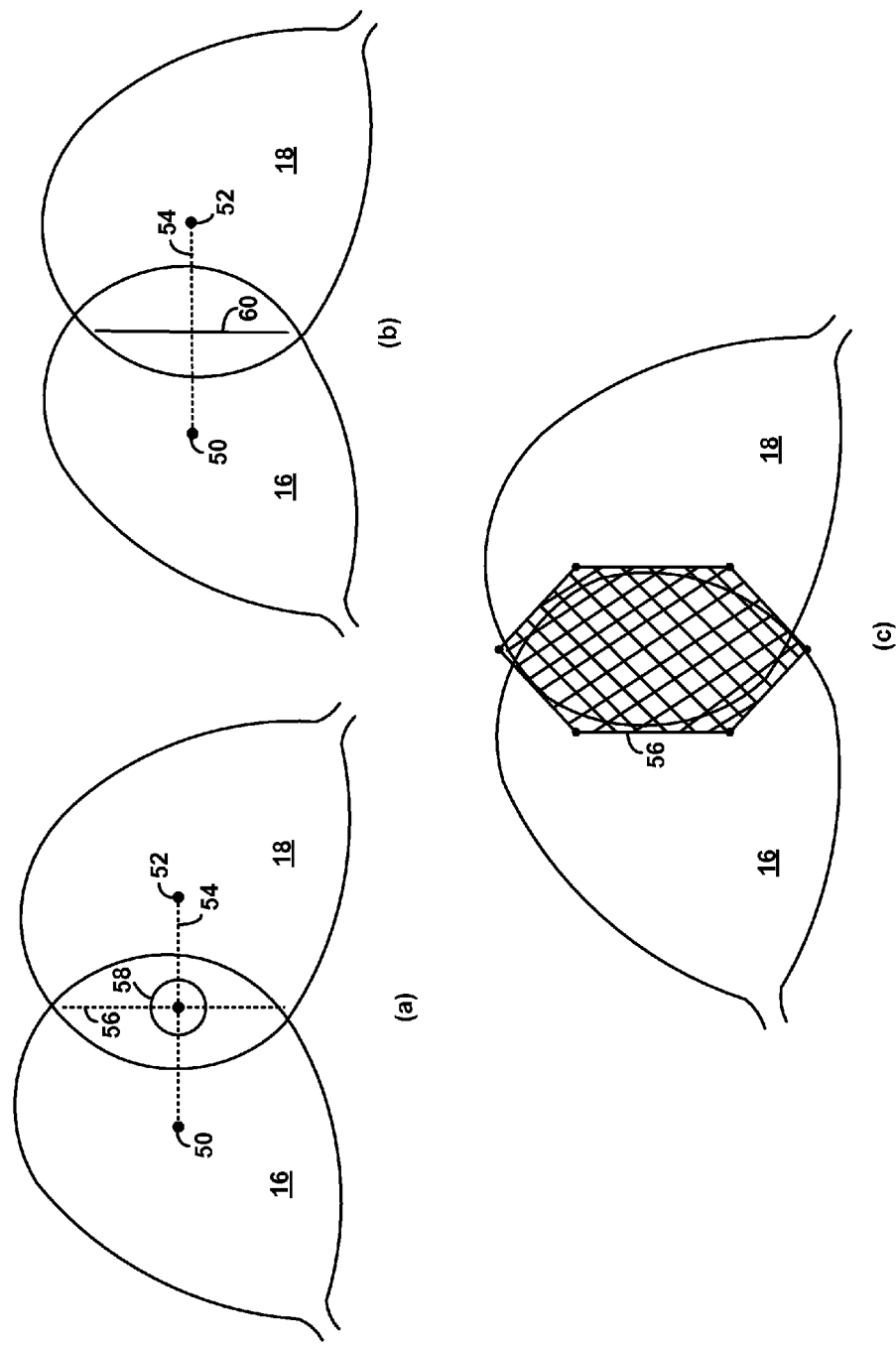

USE OF PING-PONG BORDER LOCATION AS APPROXIMATED MOBILE STATION LOCATION

BACKGROUND

Cellular mobile stations, such as a mobile phones and personal digital assistants, have become increasingly common in recent years. In general, a cellular mobile station communicates over an air interface with a base station, which provides the mobile station with access to network resources, such as a communication channel to interact with other devices or with network servers.

In a typical cellular wireless communication system, multiple base stations are positioned throughout a market area, and each base station radiates to define wireless coverage areas such as cells and, in turn, cell sectors, in which mobile stations can operate. One or more base stations are then typically coupled or integrated with a base station controller, which manages air interface operation such as use of air interface channels and handoff of mobile stations between sectors. In turn, one or more base station controllers may be coupled with a switch (e.g., mobile switching center) or gateway (e.g., packet data serving node) that provides connectivity with a transport network such as the public switched telephone network (PSTN) or the Internet. With this arrangement, a mobile station may communicate via a base station, base station controller, and the switch or gateway, with entities on the transport network.

Air interface communication between the base station and a mobile station may operate in accordance with various air interface protocols, well known examples of which include CDMA (e.g., 1xRTT, 1xEV-DO), WiMAX (e.g., IEEE 802.16), iDEN, TDMA, AMPS, GSM, GPRS, UMTS, and EDGE, among others now known or later developed.

In general, each base station in a cellular wireless communication system broadcasts a pilot signal in each of its wireless coverage areas, to enable mobile stations to detect the presence of the wireless coverage areas and to facilitate handoff between the coverage areas. In practice, when a mobile station is served by a given coverage area, if the mobile station detects a sufficiently stronger pilot signal from another coverage area, the mobile station may initiate a handoff to the other coverage area. For instance, the mobile station may send a pilot strength management message over an air interface control channel, to notify its serving base station controller that the mobile station has detected a threshold stronger coverage area. With approval from the base station controller, the mobile station may then hand off to the new coverage area. Handoffs such as this can occur as a mobile station moves away from one base station and approaches another, and/or as the scope of wireless coverage areas change (e.g., the areas expand and contract) due to variations in network load or other factors.

An important feature of contemporary cellular wireless networks is an ability to determine the location of a mobile station. Such a feature was initially developed to assist emergency services in locating mobile stations. However, the availability of location information to support emergency services has given rise to the development of many other location-based service (LBS) applications as well. For example, given the location of a mobile station, a location based service provider (e.g., a cellular wireless service provider or a third party) can provide the mobile station's user with information related to that location, such as a weather or traffic report, a list of services or establishments (e.g., restaurants, parks, or theatres), and/or a map of the user's location with directions for travel between the user's location and another location. Many other examples are possible as well.

Several mechanisms exist to determine the location of a mobile station. A most rudimentary mechanism, for example, is to simply determine the location of the wireless coverage area that is currently serving the mobile station. In some systems, for instance, each base station may broadcast its geographic location coordinates. Thus, a served mobile station may receive the base station indication of location, and that location may be used as a generalized representation of the mobile station's location.

More advanced location determination mechanisms involve use of satellite positioning technology, such as the Global Positioning System (GPS). With such a system, to determine the location of a mobile station, the mobile station may measure round trip signal delays from nearby base stations and report the delay measurements to a mobile positioning center (MPC) in the network. The MPC may then use the reported delay measurements as a basis to estimate the mobile station's location. Given the location estimate, the MPC may then determine which satellites should be in the sky over the mobile station, and the MPC may direct the mobile station to tune to those satellites so as to receive satellite signal data. Once the mobile station receives the necessary satellite signal data, the mobile station may then report the data to the MPC, and the MPC may then use the satellite signal data as a basis to more accurately compute the mobile station's location.

In general, these location determination processes can be triggered by a request from a user of the mobile station or by a request from some other party. By way of example, a user of the mobile station may invoke an application on the mobile station to determine the mobile station's location or to determine information based on the mobile station's location. In response, the mobile station may then invoke a location determination process, to facilitate response to the user's request. The mobile station may then report or use the determined location itself and/or may provide the determined location to a location based service provider to facilitate a location based service. As another example, a location base service provider may request the mobile station's location, through interaction with the MPC or the mobile station, which may trigger a location determination process to facilitate providing the location based service provider with the mobile station's location. Other examples are possible as well.

Unfortunately, however, problems exist with these existing location determination processes. Use of base station location as a representation of mobile station location, for instance, while simple and inexpensive, is inherently inaccurate due to the scope of base station coverage areas. In particular, if a wireless coverage area spans a number of miles as is typical, representing the location of a mobile station by the location of its serving base station may have significant uncertainty. Use of satellite positioning, on the other hand, while far more accurate, suffers from a further drawback in terms of consumption of network resources. In particular, to facilitate satellite based location determination, the mobile station typically needs to communicate with the MPC via one or more air interface control or traffic channels, thus limiting the resources available for other use in the network. Consequently, an improvement is desired.

OVERVIEW

Disclosed herein is a method for determining the location of a mobile station with greater accuracy than serving base station location and yet preferably without the consumption of network resources typical of satellite-based location determination. The method is applicable in a scenario where a mobile station is ping-ponging (or has just been ping-ponging) between two non-coterminous wireless coverage areas. According the method, in that scenario, the location of the mobile station will be approximated conveniently as the location of overlap between the two wireless coverage areas, since it is most likely that the mobile station resides in that overlap area.

In practice, for instance, when the location of a mobile station is to be determined (e.g., in response to a request for the location), the mobile station or its serving network may detect ping-ponging of the mobile station between two wireless coverage areas. In turn, the mobile station or its serving network may then refer to predefined data that correlates pairs of wireless coverage areas with the locations of their areas of overlaps, to readily determine the location of the area of overlap between the two wireless coverage areas. Alternatively, a somewhat more complex process could be carried out, such as by determining the centroids of the two coverage areas and then using those centroids to geometrically compute an overlap location for the coverage areas, such as a perpendicular bisector of a line segment extending from one centroid to the other, or simply a point bisecting that line segment.

These as well as other aspects, advantages and alternatives will become apparent to those of ordinary skill in the art by reading the following detailed description, with reference where appropriate to the accompanying drawings. Further, it should be understood that the description provided in this summary and elsewhere in this document is intended to convey examples only and thus does not necessarily limit the scope of the method and system as claimed.

BRIEF DESCRIPTION OF THE DRAWINGS

FIG. 2 is a flow chart depicting functions that can be implemented in accordance with the exemplary method.

FIG. 3 is a schematic illustration of several ways to represent a ping-pong border location as an approximation of mobile station location in accordance with the exemplary method.

DETAILED DESCRIPTION

Figure 1:
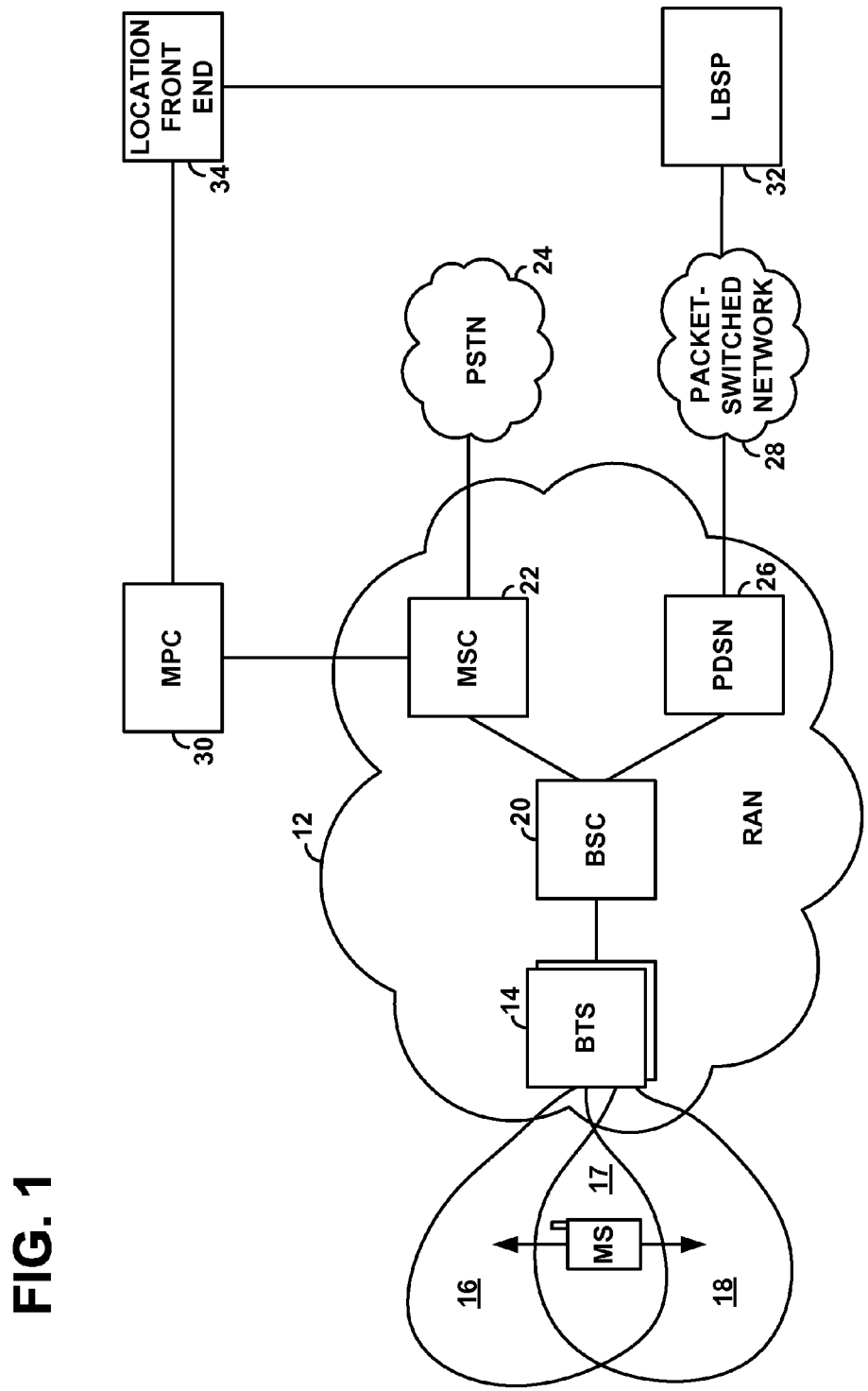
FIG. 1 is a simplified block diagram of a cellular wireless communication system in which an exemplary embodiment of the method can be implemented.

Referring to the drawings, as noted above, FIG. 1 is a simplified block diagram of a cellular wireless communication system in which the exemplary method can be implemented. As shown, the system includes at its core a radio access network (RAN) 12 arranged to serve mobile stations and thus to provide mobile stations with access to network resources such as connectivity with the PSTN and/or the Internet.

RAN 12 includes one or more base transceiver stations (BTSs) or base stations 14, each of which includes one or more antenna elements and associated equipment for radiating to define one or more wireless coverage areas such as a cell and/or cell sectors. FIG. 1 depicts two example wireless coverage areas 16, 18. These coverage areas may originate from a common base station or from separate base stations. Further, the coverage areas may support air interface communication between the RAN and served mobile stations according to any of the air interface protocols noted above, including others now known or later developed.

For ease of illustration, FIG. 1 depicts a single mobile station (MS) 20 operating in the coverage of the RAN 12. As shown, the mobile station 20 is situated in an area of overlap 17 of the two depicted wireless coverage areas 16, 18. In that position, the mobile station may ping-pong between the wireless coverage areas, as indicated by the up and down arrows in the figure. In particular, the ping-ponging process may involve the mobile station engaging in back-and-forth handoff between the two coverage areas, particularly if the signal strengths of the coverage areas are similar and yet fluctuating.

Each base station 14 of the RAN is coupled with and controlled by a base station controller (BSC) 20, which, as noted above, manages aspects of air interface communications such as handoff of mobile stations between coverage areas and the like. The BSC 20, in turn, is coupled with a mobile switching center (MSC) 22 that provides connectivity with the PSTN 24, and the BSC 20 is further coupled with a packet data serving node (PDSN) 26 that provides connectivity with a packet-switched network 28 such as the Internet. Through this arrangement, if mobile station 20 is suitably equipped, mobile station 20 can engage in phone calls on the PSTN via the RAN, and mobile station 20 can similarly acquire packet data connectivity and engage in packet-switched communication, such as web communication, on the Internet.

As further shown in FIG. 1, the RAN is coupled with a mobile positioning center (MPC) 30, which functions to determine and report mobile station location, or to facilitate determination and reporting of mobile station location. For example, MPC 30 may receive from mobile station 20 a request to determine the location of mobile station 20, and MPC may responsively invoke a process to determine the location of the mobile station, such as through triangulation of base station round trip delay measurements and/or satellite positioning, and then report the determined location to the mobile station. As another example, MPC 30 may receive from a location based service provider (LBSP) 32, possibly via a location front end server 34, a request for the location of mobile station 20, and MPC may similarly invoke a process to determine the location of the mobile station and then report the determined location to the requesting LBSP. For this processing, MPC 30 may interact with various position determining equipment (PDE), not shown.

The signaling that passes between mobile station 20 and MPC 30 to facilitate location determination may take the form of "control plane" signaling, typically where the mobile station communicates with the RAN via air interface control or traffic channels, and the RAN (e.g., the MSC) communicates with the MPC via signaling messages, much like the messaging that normally passes through a cellular service provider's network to convey short messaging service (SMS) messages from point to point. Alternatively, the signaling between the mobile station and the MPC 30 may take the form of "user plane" signaling, where the MPC sits as a node on the packet-switched network 28, and the mobile station engages in packet-based communication with the MPC via that network, in much the same way that the mobile station would engage in packet-based communication with other entities on the packet-switched network.

Referring next to FIG. 2, a generalized flow chart is provided to illustrate functions carried out in accordance with the present method. As shown in FIG. 2, at block 40, the method involves detecting ping ponging of a mobile station between two wireless coverage areas. At block 42, the method then involves determining a ping-pong border location for the two wireless coverage areas. And at block 44, the method involves reporting the determined ping-pong border location as an approximated location of the mobile station, to facilitate a location based service keyed to the approximated location.

In practice, the method may further involve detecting a request for the location based service, in which case the act of determining the ping-pong border location may occur (directly or indirectly) in response to (i) the detecting of the ping-ponging and (ii) the detecting of the request for the location based service. For example, in response to the request for the location based service, one or more network entities may determine whether the mobile station is or has been ping-ponging and, if so, the one or more entities may then responsively determine the ping-pong border location for the subject wireless coverage areas and provide that location as the approximation of the mobile station location.

Further, the method may involve providing the location based service based on the approximated location of the mobile station. For example, if the location based service is informing the mobile station user where the user is located, the act of providing the location based service based on the approximated location may be simply presenting the approximated location to the user of the mobile station, on a display of the mobile station for instance. As another example, if the location based service is providing a user or some other party with information based on the mobile station's current location (such as an indication of a nearby establishment, or navigation information), the act of providing the location based service based on the approximated location may be to determine that information based on the approximated location and to provide the determined information.

The functions of detecting the ping-ponging, determining the ping-pong border location, and reporting the determined ping pong border location as an approximation of the mobile station's location can be carried out by one or more entities, such as various entities shown in FIG. 1 for instance.

By way of example, all of these functions can be carried out primarily by mobile station 20. For instance, the mobile station can programmatically detect its own ping-ponging between coverage areas 16, 18, by maintaining in data storage a record of each of its handoffs and by referring to those records to determine that the mobile station has been handing off back and forth between coverage areas 16, 18 for a threshold period or at a threshold rate.

The mobile station may then determine the ping pong border location (e.g., in response the detecting the ping-ponging and perhaps in response to a location request (e.g., from some other entity or internally triggered) by referring to a set of predefined data that correlates pairs of wireless coverage areas with their ping-pong border locations, i.e., for each pair indicating a location deemed to be or represent geographically where the wireless coverage areas overlap each other (such as a centroid of the overlap area, or a bisector of the overlap area, for instance). This predefined data may be stored in advance in data storage of the mobile station, to facilitate ready access. Alternatively or additionally, the data may be stored or accessible by another entity, such as MPC 30 or MSC 22, in which case the mobile station may engage in signaling to query the ping-pong border location from that other entity, given the identities of the two wireless coverage areas at issue.

Alternatively, the mobile station may refer to a set of predefined data that indicates the centroid locations of each coverage area, and the mobile station may use or cause use of that centroid data to determine the ping-pong border location. This centroid data may again be stored in the mobile station for ready access. For instance, the data could be pre-provisioned into the mobile station, or the MPC or other entity could provision the mobile station with the data through an over-the-air provisioning process or as part of a previous location determination process (e.g., when providing base station almanac data to the mobile station). Alternatively, the centroid data may be stored or accessible by another entity, such as MPC 30 or MSC 22, in which case the mobile station may engage in signaling to query the centroid location data from the other entity, given the identities of the wireless coverage areas. The centroid locations may be represented as geographic coordinates, such as latitude and longitude coordinates, or in some other manner.

The mobile station may then use the centroid locations to geometrically compute the ping-pong border location for the two wireless coverage areas. For instance, the mobile station may compute as the ping-pong border location a geographic point that is half way between the two centroid locations (or substantially half-way between those centroid locations—such as a location that is within some error tolerance (e.g., a tolerance in the range of 1 to 1,000 feet) from the exact half-way point). Alternatively, the mobile station may compute as the ping-pong border location a line that perpendicularly bisects a line segment extending from the centroid of one coverage area to the centroid of the other coverage area, or can otherwise define the ping-pong border location based on that perpendicular bisector. For instance, the computed perpendicular bisector could be set at a length depending on the signal strengths of each coverage area, as detected by the mobile station, or could be set at some default length. The mobile station may apply other mechanisms to compute the ping-pong border location as well. More generally, the ping-pong border location could be modeled or represented in some other manner as the location of overlap of the two coverage areas, such as a polygon or other geometric representation of the area of overlap, based on estimated and/or empirical data regarding the scope of each coverage area.

Still alternatively, the mobile station could determine the ping-pong border location by causing some other entity, such as MPC 30 or MSC 22, to compute the ping-pong border location based on the centroids of the coverage areas. For instance, the mobile station querying of such another entity in the first place may cause the other entity to determine the coverage area centroids (e.g., by referring to correlation data such as that described above) and further to then compute the ping-pong border location based on those centroids (e.g., by applying one of the computation mechanisms described above.) Alternatively, after the mobile station has determined or obtained an indication of the centroid locations, the mobile station may then query an entity, such as MPC 30 or MSC 22, to determine the ping-pong border location based on those centroid locations, and the entity may responsively compute the ping-pong border location and return it to the mobile station.

FIG. 3 is a schematic illustration of several ways to represent ping-pong border location in accordance with the exemplary method. As shown in illustration (a), the centroid locations of coverage areas 16, 18 are represented by points 50, 52 (e.g., location coordinates). A line 54 can then be programmatically computed to extend from centroid 50 to centroid 52. In turn, line 54 can be programmatically bisected as indicated by bisector 56, to identify a point 58 substantially half way between the two centroid locations. That point, by its location coordinates, can then be used as a representation of the ping-pong border location, as it is fairly indicative of the location of overlap between the two coverage areas.

As shown next in illustration (b), the ping-pong border location can additionally or alternatively be represented by a line 60 programmatically determined to perpendicularly bisect the line 54 extending from centroid 50 to centroid 52, and having a designated length. And as shown next in illustration (c), the ping-pong border location can additionally or alternatively be represented by a polygon 62 generally indicating the area of overlap of the coverage areas, as determined by drive-mapping data or the like. Such a polygon can be represented by location coordinates indicating its vertices. Various other representations of ping-pong border location are possible as well.

Once the mobile station has determined the ping-pong border location, the mobile station may then report the determined ping-pong border location as an approximation of the mobile station's location, with or without expressing that the location is approximate. For example, the mobile station may present the determined location on a display screen to a user of the mobile station. As another example, the mobile station may internally report the determined location to an application such as a navigation application, which may then use the determined location as a basis to provide a location based service for a user of the mobile station, such as to provide navigation instructions to the user. As still another example, the mobile station may report the determined location to an Internet-based service to obtain navigation or other location-based information in response. And as yet another example, the mobile station may provide the determined location within call setup signaling, such as Session Initiation Protocol (SIP) signaling for instance, when the mobile station is initiating communication with another entity, such as public safety answering point, customer service center, or other location-based service provider, for instance, so that the other entity can receive the reported location during or upon initiation of the session and can use the location as a basis to provide some service for the mobile station (such as emergency response service for instance). Numerous other examples are possible as well.

In another implementation, some or all of these functions can be carried out primarily by the RAN 12 serving the mobile station, such as by MSC 22. For instance, the RAN can detect ping-ponging of the mobile station between coverage areas 16, 18, by maintaining in data storage a record of each of the mobile station's handoffs (which the RAN may have approved or at least learned about from the mobile station) and by referring to those records to determine that the mobile station has been handing off back and forth between coverage areas 16, 18 for a threshold period or at a threshold rate.

The RAN may then determine the ping pong border location (e.g., in response the detecting the ping-ponging and perhaps in response to a location request from the mobile station, from the MPC, from some other entity, or internally triggered) by referring to a set of predefined data that correlates pairs of wireless coverage areas with their ping-pong border locations. This predefined data may be stored in advance in the RAN, with respect to some or all of the coverage areas emanating from the RAN, to facilitate ready access. Alternatively or additionally, the data may be stored or accessible by another entity, such as the mobile station or MPC 30, in which case the RAN may engage in signaling to query the ping-pong border location from that other entity, given the identities of the two wireless coverage areas at issue.

Alternatively, the RAN 12 may refer to a set of predefined data that indicates the centroid locations of each coverage area, and the RAN may use or cause use of that centroid data to determine the ping-pong border location. This centroid data may again be stored in the RAN for ready access. For instance, the data could be stored in a database accessible to the MSC. Alternatively, the centroid data may be stored or accessible by another entity, such as MPC 30, in which case the RAN may engage in signaling to query the centroid location data from the other entity, given the identities of the wireless coverage areas.

The RAN may then use the centroid locations to geometrically compute the ping-pong border location for the two wireless coverage areas. For instance, the RAN may compute the ping-pong border location in one of the ways discussed above or in some other way.

Still alternatively, the RAN could determine the ping-pong border location by causing some other entity, such as MPC 30, to compute the ping-pong border location based on the centroids of the coverage areas. For instance, the RAN querying of such another entity in the first place may cause the other entity to determine the coverage area centroids (e.g., by referring to correlation data such as that described above) and further to then compute the ping-pong border location based on those centroids (e.g., by applying one of the computation mechanisms described above.) Alternatively, after the RAN has determined or obtained an indication of the centroid locations, the mobile station may then query an entity, such as MPC 30, to determine the ping-pong border location based on those centroid locations, and the entity may responsively compute the ping-pong border location and return it to the RAN.

The RAN may then report the determined ping-pong border location as an approximation of the mobile station's location, with or without expressing that the location is approximate. For example, the RAN may transmit the determined location to the mobile station (e.g., in response to a request for location from the mobile station), for presentation to a user of the mobile station or for use by the mobile station to facilitate or to request or otherwise trigger a location-based service. As another example, the RAN may transmit the determined location to a location based service provider (e.g., in response to a request from the location based service provider) to facilitate a location based service by that service provider. As still another example, the RAN may transmit the determined location to the MPC 30, to enable the MPC 30 to carry out or cause to be carried out a location-based service.

As yet another example, once the RAN has determined the ping-pong border location, the RAN may report that location as the approximated location of the mobile station by publishing the determined ping-pong border location for retrieval by a location-based service provider. For instance, the RAN may transmit the determined location to a presence server in response to a subscription by the presence server, and the presence server may transmit the determined location to the location based service provider in response to a request or subscription by the location based service provider. Alternatively, the RAN may otherwise deposit the determined location into a storage database to which the location based service provider has access, and the location based service provider may then dip into that database to obtain the determined location, so as to facilitate the location based service.

Still further, as another example, the RAN may report the determined ping-pong border location as the approximated location of the mobile station by adding the determined location into a message that is in transit from the mobile station to the location based service provider. For instance, when the mobile station is originating a communication session by sending a SIP message or the like via the RAN to a location based service provider, the RAN may modify the SIP message or the like by adding to the message the determined location, so that the location based service provider would receive the determined location together with the message, and so that the location based service provider can then provide a service based on the determined location. Alternatively, when the mobile station sends a web request (such as an HTTP request or the like) via the RAN to a web or other content server, the RAN may modify the web request by adding to the request the determined location, so that the server would receive the determined location together with the web request and can thereby provide a location based service keyed to the determined location. Numerous other examples are possible as well.

In the foregoing or other implementations of the present method, the act of detecting the ping-ponging of the mobile station between the wireless coverage areas can involve determining that the mobile station is currently ping-ponging between the coverage areas and/or determining that the mobile station has recently ping ponged between the coverage areas. As noted above, this functionality can be carried out by reference to records of handoffs involving the mobile station.

In practice, for instance, each time the mobile station engages in a handoff from one coverage area to another (e.g., a soft handoff, hard handoff, or other type of handoff), the mobile station and the RAN may each store a record of the handoff, indicating the source coverage area and the target coverage area, a timestamp indicating when the handoff occurred, and, in the case of the RAN, an identifier of the mobile station at issue. To detect current ping-ponging of the mobile station, the mobile station or RAN may determine from those records, perhaps in combination with a current handoff involving the mobile station, that the mobile station has handed off back and forth between the two coverage areas a threshold number of times in a row, a threshold number of times in a period of time (e.g., a threshold rate of ping-ponging), or the like. To detect that the mobile station has recently been ping-ponging between the coverage areas, the mobile station or RAN could determine from the records that the mobile station had a threshold extent of back and forth handoff, the last instance of which occurred less than a defined period ago indicating that the ping-ponging was recent. The defined period could be set as a matter of design choice.

In practice, the one or more entities that implement functions of the present method will be equipped with a processor, data storage, and program logic stored in the data storage and executable by the processor to carry out the applicable functions. Alternatively or additionally, the one or more entities may carry out one or more of the various functions by implementing hardware or other types of logic. Generally, each entity that carries out any of the functions will be a machine rather than a human being, and the machine will be configured to carry out the applicable functions.

Those of ordinary skill in the art will appreciate the clear utility of this method, in that the method provides a simplified manner to represent the location of a mobile station so as to facilitate any of a variety of location based services keyed to that location. As such, those of ordinary skill in the art will also appreciate that functions of the present method, while described above as being carried out by particular entities, could just as well be carried out by one or more other entities, and that the configuration and method shown in the figures and described throughout this document can be modified in numerous ways while remaining within the scope of the appended claims.

We claim:

1. A method comprising:
   detecting ping ponging of a mobile station between two wireless coverage areas;
   responsive to at least detecting the ping ponging, determining a ping-pong border location for the two wireless coverage areas, wherein the ping-pong border location is a location representing geographically where the two wireless coverage areas between which the mobile station was detected to be ping ponging overlap; and
   reporting the determined ping-pong border location as an approximated location of the mobile station, to facilitate a location based service keyed to the approximated location.

2. The method of claim 1, further comprising providing the location based service based on the approximated location.

3. The method of claim 1, further comprising detecting a request for the location based service, wherein the determining of the ping pong border location occurs in response to a combination of (i) the detecting the ping ponging and (ii) the detecting the request for the location based service.

4. The method of claim 1, wherein the detecting, determining, and reporting are carried out by the mobile station.

5. The method of claim 4, wherein reporting the determined ping-pong border location as the approximated location of the mobile station comprises the mobile station reporting the determined ping-pong border location to a location based service provider via a packet-switched network.

6. The method of claim 4, wherein reporting the determined ping-pong border location as the approximated location of the mobile station comprises the mobile station reporting the determined ping-pong border location within packet-based call setup signaling when setting up a call between the mobile station and a location-based service provider.

7. The method of claim 1, wherein the detecting, determining, and reporting are carried out by a radio access network serving the mobile station.

8. The method of claim 7, wherein reporting the determined ping-pong border location as the approximated location of the mobile station comprises the radio access network publishing the determined ping-pong border location for retrieval by a location based service provider.

9. The method of claim 7, wherein reporting the determined ping-pong border location as the approximated location of the mobile station comprises the radio access network adding the determined ping-pong border location into a message that is in transit from the mobile station to a location based service provider, so that the location based service provider receives the determined ping-pong border location when the location based service provider receives the message.

10. The method of claim 1, wherein detecting the ping ponging comprises detecting that the mobile station is ping ponging between the wireless coverage areas.

11. The method of claim 1, wherein detecting the ping ponging comprises detecting that the mobile station has recently ping ponged between the wireless coverage areas.

12. The method of claim 1, wherein determining the ping-pong border location for the two wireless coverage areas comprises:
   referring to data that correlates pairs of wireless coverage areas with locations of borders between the wireless coverage areas of the pairs, to determine a location of a border between the two wireless coverage areas, and concluding that the determined location is the ping pong border location.

13. The method of claim 1, wherein determining the ping-pong border location for the two wireless coverage areas comprises:
   querying at least one other entity to determine the ping pong border location for the two wireless coverage areas.

14. The method of claim 13, wherein the at least one other entity comprises a mobile positioning center.

15. The method of claim 1, wherein determining the ping pong border location for the two wireless coverage areas comprises:
   determining centroid locations of the two wireless coverage areas; and
   determining the ping pong border location based on a location point substantially halfway between the determined centroid locations of the two wireless coverage areas.

16. The method of claim 15, wherein determining the ping pong border location based on the point substantially halfway between the determined centroid locations of the two wireless coverage areas comprises:
   determining the location point that is substantially halfway between the determined locations of the two wireless coverage areas; and
   treating the determined location point as the ping pong border location.

17. The method of claim 15, wherein determining the ping pong border location based on the point substantially halfway between the determined locations of the two wireless coverage areas comprises:
   determining the ping pong border based on a perpendicular bisector of a line intersecting the determined centroid locations of the two wireless coverage areas.

18. The method of claim 1, wherein determining the ping pong border location comprises determining the ping pong border location as at least one or more location coordinates.

19. A method comprising:
   receiving into a mobile station from a user of the mobile station a request for a location based service; and
   responsive to the request, the mobile station approximating a location of the mobile station and sending the approximated location to a location based service provider to enable the location based service provider to provide the requested location based service based on the approximated location,
   wherein approximating the location of the mobile station comprises (i) detecting ping ponging of the mobile station between two wireless coverage areas of a cellular wireless communication system, (ii) determining centroid locations of the two wireless coverage areas, (iii) using the determined centroid locations as a basis to identify a ping pong border location between the two wireless coverage areas wherein the ping pong border location is a location representing geographically where the two wireless coverage areas between which the mobile station was detected to be ping ponging overlap, and (iv) deeming the identified ping pong border location to be the approximated location of the mobile station.

20. The method of claim 19, wherein determining the centroid locations of the two wireless coverage areas comprises querying a mobile positioning center to ascertain the centroid locations.

* * * * *